UNITED STATES PATENT OFFICE.

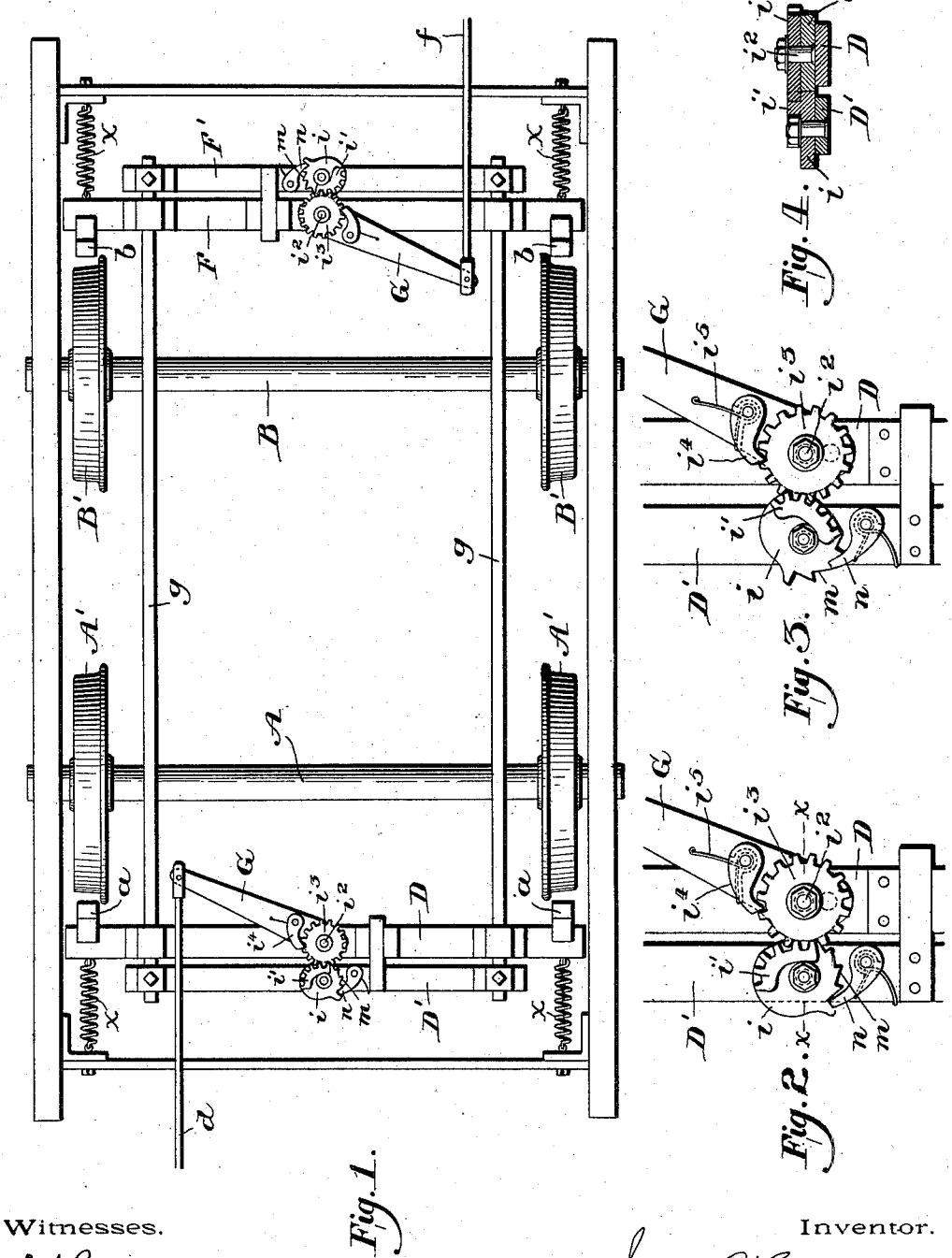

JAMES A. CRISWELL, OF PHILADELPHIA, PENNSYLVANIA, ASSIGNOR, BY DIRECT AND MESNE ASSIGNMENTS, TO J. WARREN COULSTON AND CHARLES O. BAIRD, OF SAME PLACE.

CAR-BRAKE.

SPECIFICATION forming part of Letters Patent No. 558,898, dated April 21, 1896.

Application filed August 27, 1895. Serial No. 560,645. (No model.)

*To all whom it may concern:*

Be it known that I, JAMES A. CRISWELL, a citizen of the United States, residing in the city of Philadelphia, State of Pennsylvania, have invented certain new and useful Improvements in Brake Mechanism for Railway-Cars, of which the following is a full, clear, and exact description, reference being had to the accompanying drawings, forming a part of this specification.

This invention relates to brake mechanism for railway-cars, having especial reference to an improvement in the slack-adjusting devices forming the subject of Letters Patent of the United States, granted to J. E. Loughridge, dated August 27, 1895, No. 545,084. Such devices, as will be seen by reference to said application, are designed to increase the braking power and to compensate automatically for wear of the brake-shoes or slack in the operating-gear of brake mechanism of the Bemis and Peckham types. The Loughridge devices, as defined in said patent, comprehend, in car-braking mechanism, a main brake-beam, a supplementary brake-beam operatively connected with the brake-shoes, a brake-operating lever hung to one of said beams, and a movable wedge, preferably, though not essentially, an eccentrically-mounted disk carried by the other beam and acted upon by said brake-operating lever in a manner to be advanced thereby when slackness of gear or wear of the shoes permits such advance, together with means, such as a pawl and ratchet, for retaining the wedge in its successive positions of advancement.

The object of the present improvement is to provide means to insure and facilitate the most effective operation of the wedge or eccentrically-mounted disk when the lever is actuated, and to this end the said wedge (shown in my drawings as a disk) is provided with a fixed toothed portion, and the lever is provided with a coacting pinion, provision being had for the retraction of the lever independently of the pinion, as will be hereinafter particularly described and claimed.

In the annexed drawings, Figure 1 is a plan of a car-truck equipped with braking mechanism embodying my improvement. Figs. 2 and 3 are details, enlarged, of the compensating devices, showing the same in different positions of adjustment. Fig. 4 is a section on the line $x\,x$ of Fig. 2.

A B are the car-axles, A' B' the wheels thereon, and D F the two brake-beams carrying the shoes $a$ and $b$, respectively.

D' F' are the supplementary beams adjacent to the main beams, respectively, there being hung to each of the latter a lever G, which is connected by a rod $d$ or $f$ with the brake-operating shaft at the opposite end of the car.

The supplementary beams D' F' are coupled by rods $g$, the lever G of each main beam being linked to the corresponding supplementary beam, so that if power be applied to the lever G of the beam D this beam and its shoes will be forced toward, and the beam D' will be forced away from, the wheels A', such movement of beams D being transmitted by the rods $g$ to the beam $f'$, and thence to the beam F, so as to draw the shoes of the latter into contact with the wheels B'. Suitably-disposed springs $x$ serve to retract the main beams from the wheels when the lever G is released.

Mounted upon each of the supplementary beams is a movable wedge, in the form of a rotatable eccentrically-mounted disk I, against which the adjacent lever G bears at a point near its fulcrum, to the end that as the lever is properly moved there will not only be effected a separation of the main and supplementary brake-beams, but, if the brake-shoes permit it, a further separation, due to the turning of the eccentric or wedge by contact with the bearing-face of the lever G, such face being preferably curved or cone-shaped, so as to facilitate the turning movement. The lever and eccentric are held firmly and effectively in contact with each other by the action of the springs $x$, above referred to. The eccentric is retained in its successive positions of advancement by means of the coacting pawl $n$ and ratchet $m$, and hence the excess of separation of the main and supplementary brake-beams which may be permitted by wear of the brake-shoes is rendered permanent, and the shoes, when the brakes are off, are normally held in close relation to the wheel-treads, so that the brakes may be always powerfully applied with a minimum movement of the brake-wheel or handle on the platform of the car.

The construction and arrangement of the parts above described are substantially identical with the corresponding parts shown and described in the Loughridge patent above referred to. Although such mechanism has been generally practical in its operation, yet I have found that the mere frictional engagement of the lever and eccentric disk is not sufficiently positive and effective to insure absolutely satisfactory results at all times. Hence to overcome any uncertainty in the action of the parts, I have provided the eccentric, adjacent to its bearing-edge, with a fixed or integral segmental rack $i'$, and have mounted on a stud $i^2$ on lever G, near the fulcrum point, a rotatable pinion $i^3$, which gears with the rack and has a partially-rotatable movement, irrespective of the movement or the position of the lever. On the lever is a pivoted pawl $i^4$, that is held yieldingly in engagement with the teeth of the pinion $i^3$ by means of a spring $i^5$, the disposition of the pawl being such that when the lever is operated to apply the brakes, as above described, the pawl locks the pinion against back movement, and in consequence the pinion positively turns the eccentric, as and for the purpose above explained. When the power is removed from the lever and the main beam is retracted to relieve the brakes, as before mentioned, the lever G resumes its position for a succeeding operation, the pawl in such movement riding over the teeth of the pinion, so as not to turn the latter. Hence as the brakes are applied from time to time the pinion is intermittently moved onward should wear or slack in any part of the brake-gear be automatically taken up or compensated for.

It will be obvious that the rotatable pinion $i^3$, mounted on the operating-lever, will coact with the ratchet fixedly secured to the eccentrically-mounted disk, and hence secure certainty of action and effectiveness of result in the operation of the lever and maintain it in its successive positions of advancement.

I claim—

1. The combination, in a car-braking mechanism, of a main brake-beam, a supplementary brake-beam, a suitable brake connected therewith, a brake-operating lever hung to one of said beams, an eccentrically-mounted disk carried by the other beam, a rack on said disk, and a coacting gear on the lever, substantially as described.

2. The combination in a car-braking mechanism, of a main brake-beam, a supplementary brake-beam, a suitable brake connected therewith, a brake-operating lever hung to one of said beams, an eccentrically-mounted disk carried by the other beam, resilient means to maintain said parts in contact, a rack on said disk and a coacting gear on the lever; substantially as described.

3. The combination, in a car-braking mechanism, of a main brake-beam, a supplementary brake-beam, a suitable brake connected therewith, a brake-operating lever hung to one of said beams, an eccentrically-mounted disk, carried by the other beam, a rack on said disk, a coacting gear rotatably mounted on the lever, and means for locking said gear and retaining it in its successive positions of advancement, substantially as described.

4. The combination in a car-braking mechanism, of a main brake-beam, a supplementary brake-beam, a suitable brake connected therewith, a brake-operating lever hung to one of said beams, an eccentrically-mounted disk carried by the other beam, a rack on said disk, a coacting gear on the lever, and means for retaining the disk in its successive positions of advancement, substantially as described.

5. The combination, in a car-braking mechanism, of a main brake-beam, a supplementary brake-beam, a suitable brake connected therewith, a brake-operating lever hung to one of said beams, an eccentrically-mounted disk on the other beam, a rack on said eccentric, a pinion rotatably mounted on the lever, and a pawl thereon coacting with the pinion; substantially as described.

In testimony whereof I have hereunto affixed my signature this 20th day of August, A. D. 1895.

JAMES A. CRISWELL.

Witnesses:
JOHN R. NOLAN,
H. T. FENTON.